Figure 1:
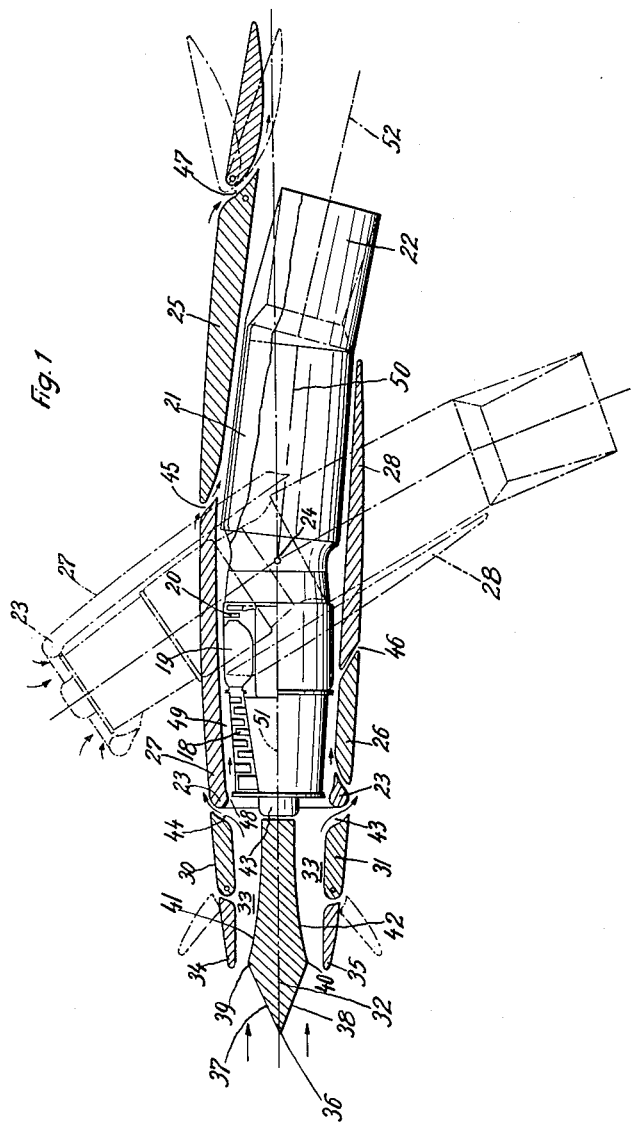

Inventor
KURT REINIGER
BY
ATTORNEYS.

United States Patent Office 3,023,981
Patented Mar. 6, 1962

3,023,981
AIRPLANE EQUIPPED WITH A GAS TURBINE PROPELLING AND LIFTING UNIT
Kurt Reiniger, Stuttgart-Zuffenhausen, Germany, assignor to Daimler-Benz Aktiengesellschaft, Stuttgart, Unterturkheim, Germany
Filed Apr. 30, 1959, Ser. No. 810,168
Claims priority, application Germany May 2, 1958
6 Claims. (Cl. 244—12)

My invention relates to an airplane equipped with a gas turbine propelling unit which is pivotally mounted for optional adjustment into a normal position for ordinary flight or into an abnormal position in which the prpelling unit produces an upwardly directed thrust to thereby facilitate starting and landing maneuvers and to render the airplane capable of flight at extremely low speeds.

It is the object of my invention to provide an airplane of this type with an improved air intake diffusor capable of efficient operation at both flight at supersonic speed and flight at subsonic speed.

When the gas turbine propelling unit is adjusted to its pivoted abnormal position for starting or landing manuevers or for flight at extremely low speeds, the air intake diffusor forming part of this unit sucks in the air in radial direction, thereby accelerating it. In order to minimize losses that would occur when the air is compelled to flow around sharp corners, it is desirable that the diffusor be provided with a large funnel-shaped intake mouth widening in forward direction. For flight at very high speeds, more particularly supersonic speeds, it is desirable, however, that the air intake into the propelling unit be effected by means of a diffusor having a tapering air displacing member and sharp and slender scooping lips producing an oblique shock wave. Therefore, air intake means designed to have a satisfactory efficiency during subsonic flight are liable to have a poor efficiency in supersonic flight and vice versa. Heretofore, a satisfactory comprise has not been accomplished.

It is another object of my invention to provide an improved airplane equipped with a gas turbine propelling unit having a supersonic air intake diffusor composed of wing elements extending transversely between a plurality of fuselages to connect same.

Moreover, it is an object of my invention to so consturct the gas turbine propelling unit pivotally mounted on the wing of an airplane as to require angular displacement by a comparatively small angle in order to produce a powerful vertical thrust component.

Further objects of my invention will appear from the description following hereinafter of a preferred embodiment thereof with reference to the accompanying drawings. It is to be understood, however, that my invention is in no way limited to the details of such embodiment but is capable of numerous modifications within the scope of the appended claims and that the terms and phrases used in such detailed description have been chosen for the purpose of illustrating the invention rather than that of restricting or limiting same.

Figure 2:
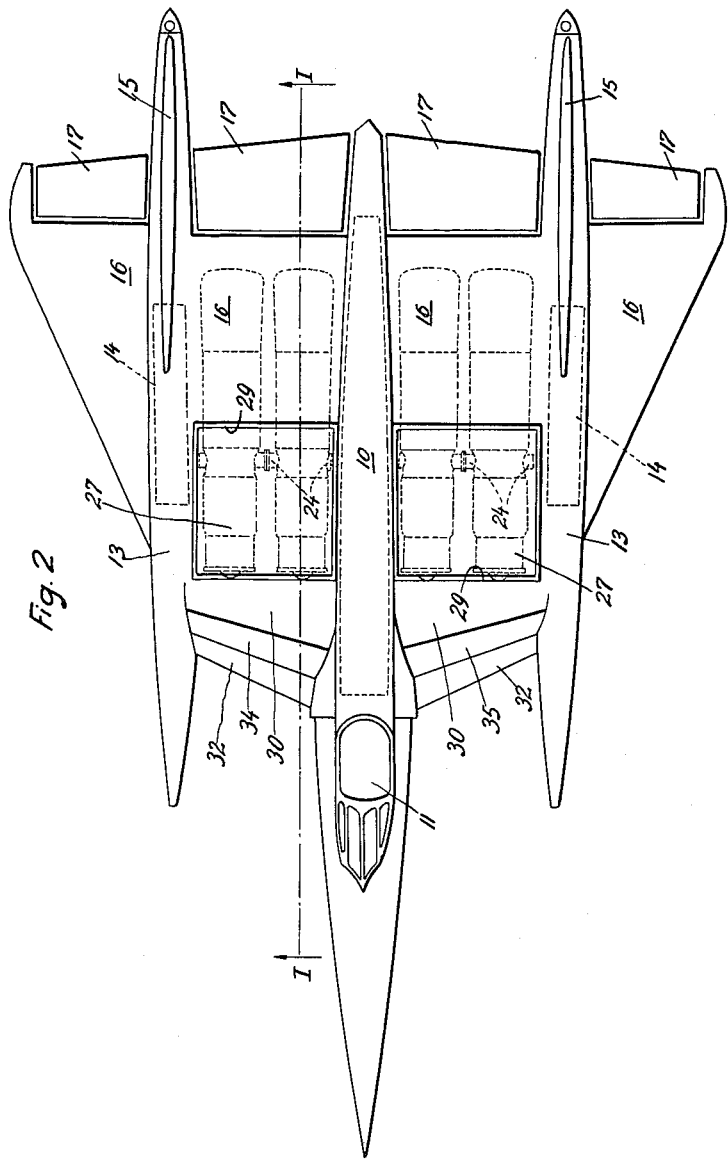

In the drawings:

FIG. 1 is a sectional view of a wing of my improved airplane in which a pivotal gas turbine propelling unit is installed, the section being taken along the plane I—I indicated in FIG. 2, and FIG. 2 is a plan view of an airplane equipped with the wing shown in FIG. 1 in which four propelling units are installed.

The plane illustrated in FIG. 2 has a central fuselage 10 provided with the cockpit 11, two lateral fuselages 13 carrying fuel tanks 14 and provided with rudders 15 and a delta wing 16 connecting the central fuselage with the lateral fuselages and extending beyond the latter and provided with ailerons 17.

For the purpose of jet propulsion the air plane is equipped with four gas turbine units mounted pairwise on the wing 16, each pair comprising two such units one disposed beside the other between the central fuselage 10 and a lateral fuselage 13.

Each of the gas turbine propulsion units comprises a rotary axial compressor 18 at its front end, peripherally distributed combustion chambers 19 supplied with the compressed air, an axial turbine 20 driven by the combustion gases, an after-burner 21 reheating the exhaust gases discharged from the turbine 20 and a thrust nozzle 22 directing the jet of exhaust gases rearwardly. The front end of this unit is provided with an annular air intake diffusor 23 constituting a large funnel-like mouth shaped for efficient subsonic operation. In order to reduce energy losses to a minimum, the front edge of the subsonic diffusor 23 is rounded as shown in FIG. 1.

The propulsion unit 18–23 is mounted on the wing 16 for pivotal movement about a horizontal axis and, for this purpose, is provided with a pair of diametrically opposite lateral trunnions 24 journaled in suitable bearings not shown carried by suitable elements of the wing 16, such as vertical partitions extending fore-and-aft and connecting the upper wall elements 25 of the wing 16 with lower wing elements 26. The wing elements 25 and 26 form part of the main portion of the wing 16. Additionally, the wing comprises a pair of auxiliary portions, each portion including an upper wall section 27 and a lower wall section 28. Each pair of propulsion units is rigidly connected with one of the two auxiliary wing portions for pivotal adjustment together therewith. As shown in FIG. 2, the main portion of the wing 16 is provided with a pair of square apertures 29 in which the wing section 27 is normally located. Each aperture 29 extends from the central fuselage 10 to a lateral fuselage 13.

When the propulsion units are adjusted to normal position for ordinary flight, the auxiliary wing portions composed of the wall sections 27 and 28 lie flush with the main portion of the wing which is rigidly connected to the fuselages 10 and 13. When the units are adjusted into inclined position shown in FIG. 1 in dash-dotted lines, however, the wall sections 27 and 28 will be tilted, thereby opening the aperture 29 for flow of air therethrough.

Between the three fuselages the main portion of the wing 16 at its front edge forms a pair of supersonic air intake diffusors, each diffusor consisting of a pair of spaced members 30 and 31 one arranged above the other and of an air displacing member 32 therebetween. At least some of the members 30, 31 and 32 constitute elements of the wing. In the embodiment shown, the elements 30 and 31 are wall sections of the main portion of the wing 16 and the air displacing member 32 is formed by an elongated body which is spaced from the wall sections 30 and 31 to form air intake channels 33 therewith in which the air compressed by oblique supersonic shock waves is conducted rearwardly and into the subsonic diffusors 23 of the propulsion units. Each of the diffusor members 30, 31 and 32 extends from the central fuselage 10 laterally and rearwardly to the lateral fuselages 13 and is rigidly connected to the fuselages. Moreover, each supersonic intake diffusor includes adjustable flaps 34 and 35 constituting relatively slender scooping lips hinged to the front edges of the wall sections 30 and 31, respectively. The air displacing member 32 has a sharp front edge 36 and upper and lower substantially plane side faces 37 and 38 diverging rearwardly to edges 39 and 40 which extend substantially parallel to the front edges of the flaps 34 and 35 and substantially in a common vertical plane therewith. Behind the edges 39 and 40 the air displacing member 32 is provided with rearwardly converging slightly concave faces 41 and 42 which cooperate with the flaps 34, 35 and the wing sections 30, 31 to confine the ducts 33 and terminate directly in front of the rotors 43 of the rotary compressors 18.

Preferably, air gaps 43, 44 are provided between the subsonic intake diffusors 23 and the supersonic intake diffusor 30–35, the upper gap 44 being confined by the rear edge of the fixed wing section 30 and the front edge of the pivotal wing section 27, the lower gap 43 being confined by the rear edge of the fixed wing section 31 and by the front edge of the fixed wing section 26. Any excess of the air taken in by the supersonic diffusor may flow outwardly through these gaps 43 and 44. Similar gaps 45 and 46 are provided between the fixed wing sections 25, 26 and the pivotal wing sections 27 and 28 for the purpose of sucking off the boundary layer and of cooling the peripheral surface of the afterburner 21 and the peripheral surface of the thrust nozzle 22.

If desired, the wing 16 may have a cross sectional V-profile enabling the ailerons 17 to act as rudders in a manner known per se. Preferably, air gaps 47 are provided between the wing sections 25 of the wing 16 and the ailerons 17 to suck off the boundary layer from the top face of the wing and to form a screen of cool air between the hot jets issuing from the nozzle 22 and the bottom faces of the ailerons 17.

The internal diameter of the annular member 23 constituting the subsonic diffusor is slightly greater than the outer diameter of the compressor housing to thereby form a gap 48 supplying cool air to the space 49 provided between the peripheral surface of the propulsion unit and the wall elements 25, 26, 27 and 28 of the wing 16. This space 49 is open at the rear for the discharge of the cooling air.

The longitudinal axis 50 of the after-burner 21 preferably forms an obtuse angle with the longitudinal axis 51 of the turbine 20 and is rearwardly and downwardly inclined, when the propulsion unit is in its normal position. Similarly, the axis 52 of the jet nozzle 22 preferably forms an obtuse angle with the axis 50 of the afterburner 21 and is rearwardly and downwardy inclined with respect to the after-burner, when the propulsion unit is in its normal position.

For starting and landing maneuvers and for flight at extremely low speeds the aviator will so control the angle of attack of the wing 16 that the maximum uplift will be attained without risking separation of the flow of air. This maximum lift $c_a$ max. will be attained with the delta wing with a comparatively large angle of attack of between 20° and 25° because of the small increase of the lift with the increasing angle of attack. Because of the inclined disposition of the axes 52 with respect to the axes 51 and because of the large angle of attack both amounting to a total of about 35° an angular adjustment through about 55° of the propulsion units from their normal position will suffice to attain a substantially vertical direction of the jets during the flight.

In slow horizontal flight with the propulsion units in normal position and with the adjustment of the airplane for the maximum lift coefficient the axes 52 of the propulsion units will include an angle of about 35° with the horizontal. This has the effect that the jets will carry more than half of the weight of the plane, and this results in comparatively low minimum speeds of flight even with adjustment of the propulsion units to their normal position.

From the above it will be appreciated that in flight at supersonic speeds with the propulsion units adjusted to their normal positions the air intake diffusors 30–35 will insure the air intake at a high efficiency and that during flight at low speeds with the propulsion units adjusted to abnormal positions, such as that shown in FIG. 1 in dash-dotted lines, the air intake will be effected by the subsonic diffusor 23 at a high efficiency. This advantage is attained by the pivotal disposition of the subsonic diffusors forming parts of the propulsion units, whereas the supersonic intake diffusors are rigidly connected with the main portion of the wing 16 and with the fuselages 10, 13.

It is another advantage of my novel airplane that the supersonic air intake diffusors 30–35 or at least the elements 30–33 thereof constitute rigid elements reinforcing the structure of the airplane. This is of particular advantage in planes having at least two propulsion units disposed one directly beside the other as in planes of this type the immovable members 30, 31 and 32 of the supersonic diffusor constitute transverse beams rigidly connected with the fuselage or fuselages.

Moreover, it will be appreciated that when the propulsion units are in their abnormal pivoted positions, the flow of air through the wing opening 29 from the suction side to the pressure side will reduce the flight resistance as is highly desirable for starting maneuvers and for upward flight. The maximum angular displacement of the propulsion units required to insure effective uplift by the jets has been reduced to a minimum by the relative angular disposition of the axes 51 and 52. While this angular disposition of the axes 51 and 52 somewhat reduces the maximum horizontal thrust, it results in a vertical component of the thrust which increases the uplift. This is particularly desirable for flight at high altitudes, as in such flight the induced flight resistance is quite material. This induced resistance, however, can be substantially diminished by the lifting effect of the jets. As a result, my novel plane is capable of reaching higher altitudes in spite of the slight reduction of the horizontal component of the thrust than could be attained with a coaxial disposition of the turbine and the jet nozzle.

From the foregoing it will be seen that this invention is one well adapted to attain all of the ends and objects hereinabove set forth, together with other advantages which are obvious and which are inherent to the combination.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In an airplane having at least two fuselages, the combination comprising a wing extending between and connecting said fuselages, at least two gas turbine propulsion units disposed one beside the other and pivotally mounted on said wing for optional adjustment into a normal position and into an inclined position in which the propulsion force produced by said units has a primarily upwardly directed component, each of said units including a first intake diffusor shaped for subsonic influx of air, a second intake diffusor shaped for supersonic influx of air positioned adjacent said units and formed by a pair of spaced wall portions of said wing one arranged above the other and extending between and connected to said fuselages, and by an air displacing member disposed between and spaced from said wall portions and extending between said fuselages and connected therewith and by adjustable flaps hinged to the front edges of said wall portions, said air displacing member projecting forwardly beyond said flaps to constitute the front edge of said wing, said second intake diffusor being so disposed relative to said units as to discharge into said first intake diffusor thereof.

2. The combination claimed in claim 1, wherein said first diffusor includes a rounded front edge, and said adjustable flaps constitute slender scooping lips which together with said air displacing member produce oblique shock waves.

3. In an airplane, the combination comprising a wing, a gas turbine propulsion unit pivotally mounted on said wing for optional adjustment between a normal position and an inclined position in which the propulsive force produced by said unit has a primarily upwardly directed component, said unit including a first intake diffusor shaped for subsonic influx of air, a turbine, and an afterburner disposed relative to said turbine so that the longitudinal axis of said afterburner forms an obtuse angle with the longitudinal axis of said turbine and is rearwardly and downwardly inclined, and a second intake diffuser mounted ahead of said unit and shaped for supersonic influx of air, said second intake diffusor being substantially rigidly mounted in said wing for discharge into said intake diffuser when said unit is in said normal position.

4. The combination claimed in claim 3 in which said gas turbine propulsion unit includes a discharge nozzle, the axis of said nozzle forming an obtuse angle with that of said after-burner and being rearwardly downwardly inclined with respect to said after-burner when said unit is in said normal position.

5. In an airplane, the combination comprising a wing having a relatively fixed upper surface, a gas turbine propulsion unit pivotally mounted on said wing for optional adjustment between a normal position and an inclined position in which the propulsive force produced by said unit has a primarily upwardly directed component, said unit including a first intake diffuser shaped for subsonic influx of air, a second intake diffuser shaped for supersonic influx of air rigidly mounted in said wing in position for discharge into said first intake diffuser when said unit is in said normal position, and means to pivot said first intake diffuser into said inclined position wherein said first intake diffuser is positioned at least partially above said upper surface of said wing.

6. In an airplane having at least two fuselages, the combination comprising a wing extending between said fuselages, at least two gas turbine propulsion units disposed one beside the other and pivotally mounted on said wing for optional adjustment into a normal position and into an inclined position in which the propulsive force produced by said units has a primarily upwardly directed component, each of said units including a subsonic intake diffuser, additional intake diffuser means adjacent said units and shaped for supersonic influx of air, said additional intake diffuser means including wall portions and air displacing means disposed between said wall portions, said additional intake diffuser means being disposed between said fuselages and being disposed relative to said units so as to discharge into said first intake diffusers thereof when said units are in said normal position.

References Cited in the file of this patent

UNITED STATES PATENTS 2,840,322    Griffith _____ June 24, 1958

FOREIGN PATENTS 154,771    Australia _____ Jan. 14, 1954
612,796    Great Britain _____ Nov. 17, 1948
688,869    France _____ May 19, 1930